United States Patent
Watanabe (10) Patent No.: US 11,831,846 B2
(45) Date of Patent: Nov. 28, 2023

(54) IMAGE PROCESSING APPARATUS WITH PRE-STORED COLOR CONVERSION PROCESSING, AND CONTROL METHOD AND STORAGE MEDIUM THEREOF

(71) Applicant: CANON KABUSHIKI KAISHA, Tokyo (JP)

(72) Inventor: Tomoyuki Watanabe, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 30 days.

(21) Appl. No.: 17/571,403

(22) Filed: Jan. 7, 2022

(65) Prior Publication Data

US 2022/0239803 A1 Jul. 28, 2022

(30) Foreign Application Priority Data

Jan. 26, 2021 (JP) ................. 2021-010687

(51) Int. Cl.
H04N 1/60 (2006.01)
(52) U.S. Cl.
CPC .......... *H04N 1/603* (2013.01); *H04N 1/6008* (2013.01)
(58) Field of Classification Search
CPC ............................................ H04N 1/60–6097
See application file for complete search history.

(56) References Cited

U.S. PATENT DOCUMENTS

| 7,230,729 | B1* | 6/2007 | Reardon | G06F 3/1247 |
| | | | | 358/1.15 |
| 11,212,422 | B2* | 12/2021 | Luo | H04N 1/6061 |
| 2002/0180755 | A1* | 12/2002 | Krueger | H04N 1/603 |
| | | | | 345/601 |
| 2005/0200869 | A1 | 9/2005 | Hayaishi | G06F 15/00 |
| 2006/0005044 | A1* | 1/2006 | Uchikawa | H04L 63/104 |
| | | | | 713/168 |
| 2019/0303733 | A1* | 10/2019 | Kozuka | H04N 1/6097 |
| 2021/0125539 | A1* | 4/2021 | Yang | G06F 3/03545 |

FOREIGN PATENT DOCUMENTS

JP 2005-252462 9/2005

\* cited by examiner

*Primary Examiner* — Barbara D Reinier
(74) *Attorney, Agent, or Firm* — Venable LLP (57) ABSTRACT

In a case where a color space that is specified by a specification unit is a predetermined color space corresponding to information that is held in advance before an image processing apparatus obtains image data, even if obtained predetermined information includes color conversion information for converting the color space of the obtained image data into another color space, a conversion unit converts the color space of the obtained image data by use of the information that is held in advance before the image processing apparatus obtains the image data, without using the color conversion information that is included in the obtained predetermined information.

18 Claims, 9 Drawing Sheets

| ...... |
| ...... |
| COLORSPACE |
| WHITE POINT |
| RGB LIGHT SOURCE |
| GAMMA |
| ...... |
| ...... |

EXIF INFORMATION

FIG.3A

| ...... |
| ...... |
| DESCRIPTION TAG |
| ...... |
| ...... |

ICC PROFILE INFORMATION

```
· · · · · · ·
· · · · · · ·
COLORSPACE : sRGB
· · · · · · ·
· · · · · · ·
```

EXIF INFORMATION OF sRGB IMAGE

FIG.6A

```
· · · · · · ·
· · · · · · ·
COLORSPACE   : NOT sRGB
WHITE POINT  : x = 0.31
               y = 0.33
RGB LIGHT SOURCE: r.x = 0.64, r.y = 0.33
                  g.x = 0.21, g.y = 0.33
                  b.x = 0.15, b.y = 0.33
GAMMA : 2.2
· · · · · · ·
· · · · · · ·
```

EXIF INFORMATION OF AdobeRGB IMAGE

FIG.6B

```
· · · · · ·
· · · · · ·
desc : sRGB
· · · · · ·
· · · · · ·
```

ICC PROFILE INFORMATION OF sRGB

FIG.7A

```
· · · · · ·
· · · · · ·
desc : AdobeRGB
· · · · · ·
· · · · · ·
```

ICC PROFILE INFORMATION OF AdobeRGB

$$\begin{bmatrix} X \\ Y \\ Z \end{bmatrix} = \overset{901}{\begin{bmatrix} M1 & M2 & M3 \\ M4 & M5 & M6 \\ M7 & M8 & M9 \end{bmatrix}} \begin{bmatrix} A \\ B \\ C \end{bmatrix}$$

CONVERSION FROM THE INPUT COLOR SPACE INTO THE XYZ COLOR SPACE

FIG.9A

$$\begin{bmatrix} R \\ G \\ B \end{bmatrix} = \overset{902}{\begin{bmatrix} K1 & K2 & K3 \\ K4 & K5 & K6 \\ K7 & K8 & K9 \end{bmatrix}} \begin{bmatrix} X \\ Y \\ Z \end{bmatrix}$$

CONVERSION FROM THE XYZ COLOR SPACE INTO THE OUTPUT COLOR SPACE

FIG.9B

IMAGE PROCESSING APPARATUS WITH PRE-STORED COLOR CONVERSION PROCESSING, AND CONTROL METHOD AND STORAGE MEDIUM THEREOF

FIELD OF THE DISCLOSURE

The present disclosure relates to an image processing apparatus, a control method, and a storage medium.

DESCRIPTION OF THE RELATED ART

In a case where a printer performs printing based on an input image, the color conversion processing for converting the color space of the input image into a color space that can be reproduced by the printer is executed.

Japanese Patent Laid-Open No. 2005-252462 discloses a method of executing the color conversion processing of image data using an ICC profile in a case where the ICC profile associated with the image data can be searched.

In the meantime, with a spread of apparatuses that convert the color space of image data, there has been a demand of converting the color space of image data by more appropriate color conversion processing.

SUMMARY OF THE DISCLOSURE

An image processing apparatus includes: an obtainment unit configured to obtain image data and predetermined information related to the image data; a specification unit configured to specify a color space of the obtained image data, based on the obtained predetermined information; and a conversion unit configured to convert the color space of the obtained image data into a color space that is set as an output color space, wherein, in a case where the color space that is specified by the specification unit is a predetermined color space corresponding to information that is held in advance before the image processing apparatus obtains the image data, even if the obtained predetermined information includes color conversion information for converting the color space of the obtained image data into another color space, the conversion unit converts the color space of the obtained image data by use of the information that is held in advance before the image processing apparatus obtains the image data, without using the color conversion information that is included in the obtained predetermined information.

Further features of the present disclosure will become apparent from the following description of exemplary embodiments with reference to the attached drawings.

DESCRIPTION OF THE EMBODIMENTS

First Embodiment

In recent years, with the spread of digital cameras, smartphones, etc., the users can easily take pictures and videos. The pictures and videos taken by the users are saved as general-purpose image data such as JPEG and TIFF. Saved image data is displayed on the screen of a smartphone, a personal computer, or the like, or used in a cloud service, or sent to a printer to be used for printing. With an increase in the image quality of the screen of a smartphone and the display device of a personal computer, the color gamut of an image that can be displayed on such a screen is also enlarged. Therefore, image data obtained by image-capturing with a digital camera, a smartphone, or the like can be saved in various color spaces so that a wide color gamut can be used. For example, in addition to the conventional sRGB, image data can be saved in a color space having a wide color gamut such as AdobeRGB, Display-P3, and DCI-P3.

For saving image data, the information of the color space of the image data is also saved along with the image data. For example, in a case of image data in JPEG format, the color space information is included in the photographic information which is the accompanying information. Alternatively, there is also a case in which an ICC profile that defines the color space of the image data is included as the accompanying information of the image data. Note that the accompanying information may be any information related to the image data and may be obtained in a state of not being attached to the image data.

In a case where a printer prints an image based on image data, the processing of converting the color space (the color conversion processing) in which the color space of the image data is converted into a color space that can be reproduced by the printer is executed. For example, if the color space of the input image data is AdobeRGB and the output color space that can be reproduced by the printer is sRGB, the color conversion processing for converting AdobeRGB into sRGB is performed.

The printer of the present embodiment stores a conversion table for converting a predetermined color space (for example, AdobeRGB) into the output color space of the printer. Therefore, if the color space of the input image data is AdobeRGB, the color conversion processing can be performed quickly by performing the color conversion with the conversion table. In the present embodiment, before executing the color conversion processing, the color space of the image to be the target of the color conversion processing is specified, and whether the color space is a color space for which the color conversion processing can be performed with the conversion table is determined. In a case of a color space for which the color conversion processing can be performed with the conversion table of the printer, even if an ICC profile is attached to the image data, the ICC profile attached to the image data is not used. Instead, the color conversion processing is appropriately performed by performing the color conversion by use of the conversion table of the printer.

[Hardware Configuration]

Hereinafter, a system which is configured with an external apparatus and a printer related to the present embodiment will be explained with reference to the drawings.

Figure 1:
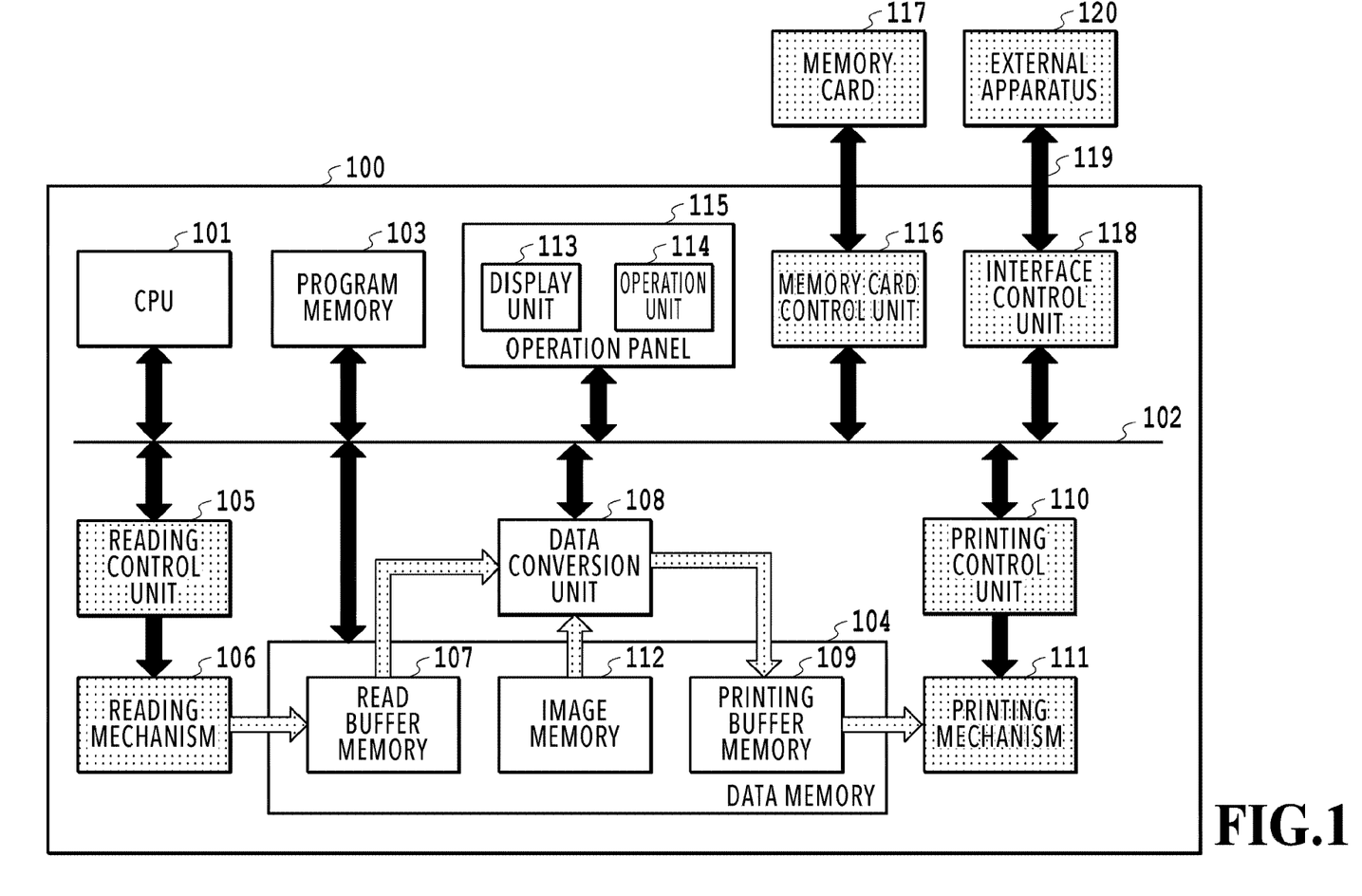
FIG. 1 is a diagram illustrating the configuration of a printer.

FIG. 1 is a block diagram illustrating the configuration of the printer 100, which is an embodiment of the technology of the present disclosure. The printer 100 includes the CPU 101, the internal bus 102, the program memory 103, the data memory 104, the reading control unit 105, the reading mechanism 106, and the data conversion unit 108. Further, the printer 100 includes the printing control unit 110, the printing mechanism 111, the operation panel 115, the memory card control unit 116, and the interface control unit 118.

The operation of the CPU 101 is based on the control programs stored in the program memory 103, which is connected via the internal bus 102, and the data read out to the data memory 104. The CPU 101 is implemented by, for example, a microprocessor. The program memory 103 is a memory in the form of ROM (Read Only Memory), and the data memory 104 is a memory in the form of RAM (Random Access Memory).

The CPU 101 loads a program code stored in the program memory 103 into the data memory 104 and executes the program code, so that thereby the printer 100 also functions as an image processing apparatus. A part or all of the functions as an image processing apparatus may be implemented by hardware such as an ASIC or an electronic circuit.

The reading mechanism 106 includes an image sensor, which is not illustrated in the drawings. The image data of a document is generated by the reading mechanism 106 reading the document with the image sensor. The CPU 101 controls the operation of the reading mechanism 106 via the reading control unit 105.

The data conversion unit 108 reads out image data from the data memory 104 and converts the image data into print data. The processing of conversion into print data includes the color conversion processing for converting the color space of image data into an output color space which is a color space that can be reproduced by the printer. The data conversion unit 108 may be implemented by hardware or by development of an operation circuit, or the function of the data conversion unit 108 may be implemented by the CPU 101 loading a program code stored in the program memory 103 into the data memory 104 and executing the program code.

The printing mechanism 111 implements a printing operation for forming an image on a printing medium, such as a sheet, based on print data. The printing operation by the printing mechanism 111 is implemented by the CPU 101 operating the printing mechanism 111 via the printing control unit 110. Note that the printing mechanism 111 is configured to be capable of printing on the label side of a disc medium, such as a compact disc or a DVD, in addition to the normal printing operation on a paper medium.

The data memory 104 is equipped with the read buffer memory 107, the printing buffer memory 109, and the image memory 112. Image data obtained by reading a document with the reading mechanism 106 is stored in the read buffer memory 107. Print data converted from image data is stored in the printing buffer memory 109.

The image memory 112 can temporarily store various kinds of image data. Further, edited image data can also be stored. The image data stored in the image memory 112 is read out and converted into print data by the data conversion unit 108, so that the printing mechanism 111 can perform the printing operation by use of the print data. Therefore, the printer 100 can also print a photographic image or the like.

The capacity allocation of the read buffer memory 107, the printing buffer memory 109, and the image memory 112 provided in the data memory 104 can be changed by the management of the CPU 101. The CPU 101 can perform the control for dynamically changing the capacity allocation of each memory according to the situation, such as the operation mode and the user setting.

The operation panel 115 has the display unit 113, which is configured with an LED, an LCD, etc., and the operation unit 114, which is configured with various kinds of operation keys, a touch panel, etc. The user can operate the operation unit 114 for various kinds of input. The CPU 101 causes the display unit 113 to display the operating status of the printer 100, etc. The CPU 101 also operates to function as a display control unit, which controls the display unit 113, and an operation control unit, which receives input from the operation unit 114.

The memory card control unit 116 controls access to the memory card 117, which is a medium for storing data, and reads and writes image data or the like that is stored in the memory card 117. The image data that is read out from the memory card 117 is stored in the image memory 112 and then converted into print data, so as to thereby be used for printing on a printing medium.

The interface control unit 118 performs communication control for the interface 119, so that data can be sent and received to and from the external apparatus 120 that is externally connected. The interface 119 is WiFi or USB, for example. The external apparatus 120 is a PC or a smartphone, and the printer 100 can receive image data that is generated by the external apparatus 120 and convert the image data into print data, in order to thereby print an image on a printing medium. Further, in addition, the printer 100 connects a digital camera or the like as an external apparatus, in order to read out photographic image data from the digital camera or the like and store the photographic image data in the image memory 112. Then, by converting the photographic image data into print data, the photographic image can be printed on a printing medium. Note that, as a method of sending print data by an external apparatus, there is a method of sending image data by utilizing a standard-installed communication protocol of the OS (hereinafter referred to as a standard protocol), which is capable of sending image data without using a printer driver for the printer 100. The standard protocol is IPP (Internet Printing Protocol), WSD (Web Services on Devices), or the like, for example. Furthermore, as a method of sending image data by an external apparatus, there is a method of sending image data by utilizing a communication protocol that is unique to the vendor of the printer 100 (hereinafter referred to as a unique protocol) with use of a printer driver for the printer 100. Although the form of utilizing the standard protocol for sending print data from an external apparatus will be explained in the following, the same processing may be executed as well in a case of utilizing a unique protocol for sending print data from an external apparatus.

[About the Configuration of an Image File]

Figure 2:
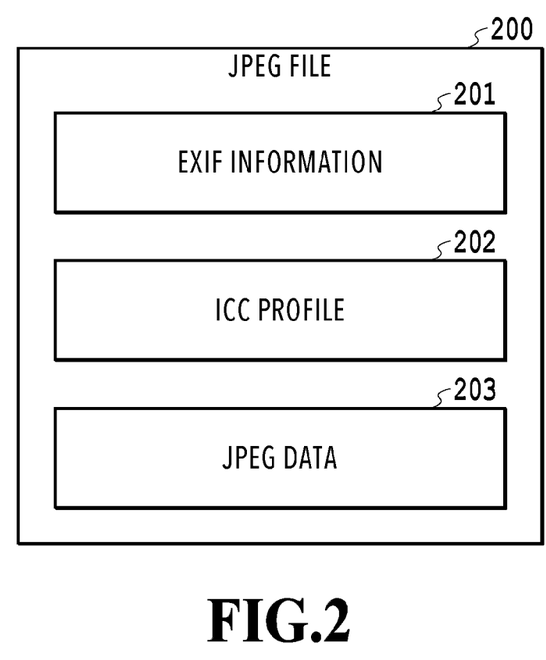
FIG. 2 is a diagram illustrating the configuration of a JPEG file.

FIG. 2 is a diagram for explaining the configuration of a JPEG file. The JPEG file is an example of an image file to be sent from the external apparatus 120 to the printer 100. The image data included in the JPEG file is image data in JPEG format (JPEG data).

The JPEG file 200 is configured with a header part which includes accompanying information of the JPEG data, and the JPEG data 203. An explanation will be given of the present embodiment on an assumption that the header part includes the EXIF information 201 which is accompanying information of the JPEG data, and the ICC profile (hereinafter, the input profile) 202 for input. An actual JPEG file may not include at least one of the EXIF information 201 and the input profile 202. Note that, in the present embodiment, the input profile is an ICC profile for converting the color space (the input color space) of the image data sent to the printer 100 into the XYZ color space which is the standard color space.

Figure 3A:
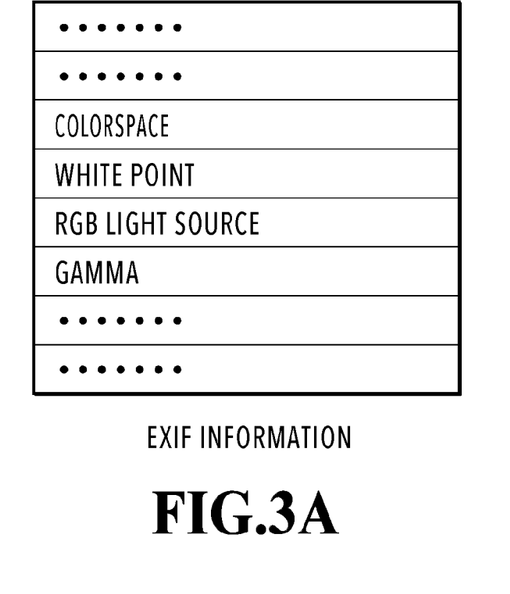
FIG. 3A and FIG. 3B are diagrams for explaining EXIF information and an ICC profile.
Figure 3B:
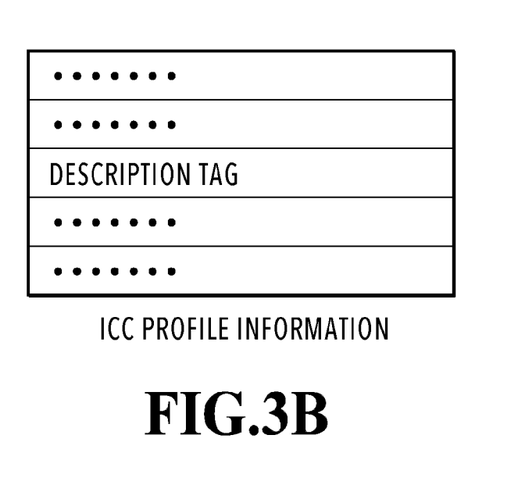

FIG. 3A and FIG. 3B are diagrams for explaining EXIF information and an input profile. FIG. 3A is an example of information included in EXIF information, and the EXIF information includes information such as ColorSpace, WHITE POINT, RGB LIGHT SOURCE, and GAMMA. FIG. 3B is an example of an input profile and includes information of DESCRIPTION TAG. In addition, the input profile includes information for performing the color conversion processing in which the color space of JPEG data is converted into the standard color space such as the XYZ color space. For example, the color conversion information for performing the color conversion processing includes a matrix (matrix values) and a look-up table.

[About the Color Conversion Processing]

The printer 100 receives a JPEG file from the external apparatus 120 and stores the received JPEG file 200 in the image memory 112. The CPU 101 performs a decompression process for the stored JPEG file. Then, the color conversion processing for converting the color space of the JPEG data which is the image data included in the JPEG file, into the output color space of the printer 100 is executed.

The output color space is a color space having a color gamut that can be reproduced by the printer 100 controlling the printing mechanism 111. For example, the output color space is DeviceRGB, sRGB, or AdobeRGB. For example, the output color space is determined based on the type of print sheet (printing medium) which is set as the printing target by the printer 100. Further, there is a case in which the color gamut that can be actually reproduced by a printer is wider than sRGB. In this case, the output color space of the printer can be defined as sRGB since the printer is able to reproduce the sRGB space. The image data after the color conversion processing is converted into print data, and the printing mechanism 111 performs printing on the printing medium, based on the print data.

Although the color conversion processing of the present embodiment will be explained with the example of a JPEG file including JPEG data in the following explanation, it is also possible to apply other image file formats, such as PNG and TIFF, to the present embodiment. The data to be the target of the processing of the present embodiment is not limited to an image file format, and image data included in a PDL data is also possible.

Figure 4:
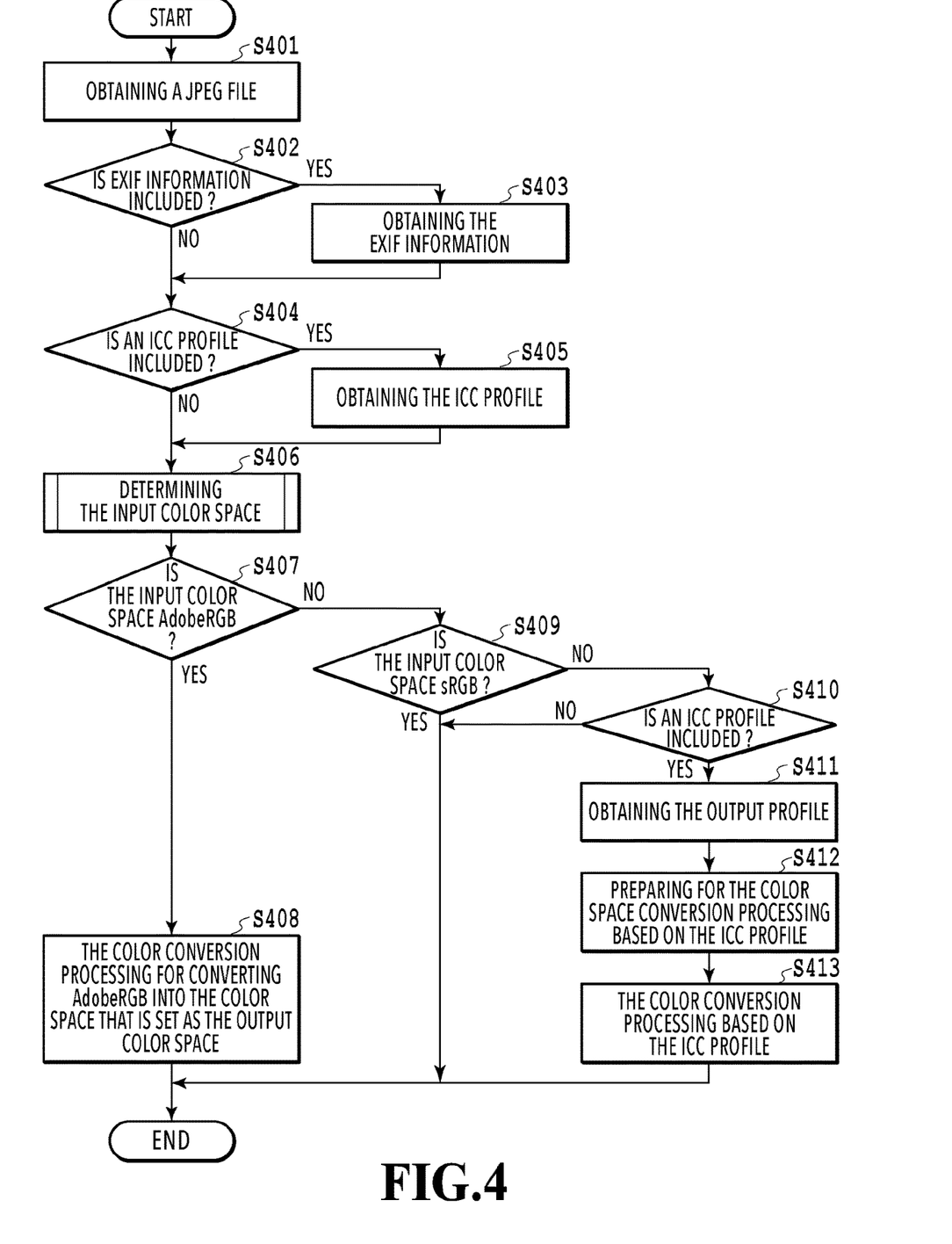
FIG. 4 is a flowchart illustrating the color conversion processing.

FIG. 4 is a flowchart for explaining the color conversion processing for a received JPEG file. The details of the color conversion processing will be explained with reference to FIG. 4. Of the series of processes illustrated in the flowchart of FIG. 4, the processes performed by the CPU are performed by the CPU 101 of the printer 100 loading a program code stored in the program memory 103 into the data memory 104 and executing the program code. Further, a part or all of the functions in the steps of FIG. 4 may be implemented by hardware such as an ASIC or an electronic circuit. Note that the symbol "S" in the explanation of each process means that it is a step in the flowchart, and the same applies to the following flowcharts. Note that the processing of the present flowchart is assumed to be the processing in a state where the output color space is set to sRGB.

In S401, the CPU 101 performs the decompression process for the JPEG file received from the external apparatus 120, so as to obtain a decompressed JPEG file. As illustrated in FIG. 2, since the JPEG file includes the accompanying information of the JPEG data, the accompanying information of the JPEG data is obtained in the present step.

In S402, the CPU 101 determines whether EXIF information is included in the accompanying information of the JPEG data. If EXIF information is included (YES in S402), the CPU 101 obtains information included in the EXIF information in S403. If EXIF information is not included (NO in S402), S403 is skipped and the processing proceeds to S404.

In S404, the CPU 101 determines whether an input profile is included in the accompanying information of the JPEG data. If an input profile is included (YES in S404), the CPU 101 obtains the input profile in S405. If an input profile is not included (NO in S404), S405 is skipped and the processing proceeds to S406.

In S406, the CPU 101 specifies the color space (the input color space) of the JPEG data included in the JPEG file which is obtained in S401.

The printer 100 of the present embodiment stores a conversion table for converting a predetermined color space into the output color space of the printer 100. Therefore, even in a case where the input profile is attached to the JPEG data, if the color space of the JPEG data is a predetermined color space, it is preferable to perform the color conversion processing with the conversion table of the printer. Therefore, a process of determining the color space of the JPEG data is performed before the color conversion processing. In the explanation of the present embodiment, it is assumed that the printer 100 stores a conversion table for converting AdobeRGB into the output color space of the printer. The details of the process of specifying the color space of the JPEG data in S406 will be described later.

In S407, the CPU 101 determines whether or not the input color space that is specified in S406 is AdobeRGB. As described above, since the printer of the present embodiment stores the conversion table for converting AdobeRGB into the output color space, if the color space of the JPEG data is AdobeRGB, the color conversion processing can be performed with the conversion table that is stored in the printer 100. Therefore, in the present step, whether the color space of the JPEG data is a color space for which the color conversion processing can be performed with the conversion table of the printer 100 is determined.

The color conversion processing is the processing of converting the color space that is specified as the input color space into the color space that is set as the output color space. Therefore, if the input color space is AdobeRGB (YES in S407), the color conversion processing (which is referred to as the AdobeRGB processing) for converting AdobeRGB into the color space that is set as the output color space is selected. Note that, in the present embodiment, the AdobeRGB processing is the color conversion processing that is executed without using the obtained input profile and the later-described output profile. That is, the AdobeRGB processing is the color conversion processing that is executed without using any ICC profile and is executed with use of the conversion table which is held in advance before the printer 100 receives the image data. Note that, in the present embodiment, the printer 100 also has a unit for executing the color conversion processing using the obtained input profile. However, in the present embodiment, the printer 100 does not perform the color conversion with the unit here but performs the color conversion with a unit for executing the color conversion with use of the above-described conversion table.

Therefore, in S408, the CPU 101 outputs the JPEG data to the data conversion unit 108, and the data conversion unit 108 performs the AdobeRGB processing for the JPEG data. Details of the present step will be described later.

On the other hand, if the input color space is not AdobeRGB (NO in S407), the CPU 101 determines whether or not the input color space is the color space that is set as the output color space of the printer in S409. In the present flowchart, the output color space of the printer is sRGB. Therefore, in the present step, whether the input color space is sRGB is determined.

If the input color space is sRGB (YES in S409), the CPU 101 selects the color conversion processing (which is referred to as the sRGB processing) for converting sRGB into the color space that is set as the output color space and outputs the JPEG data to the data conversion unit 108. Note that, in the present embodiment, as with the AdobeRGB processing, the sRGB processing is the color conversion processing that is executed without using the obtained input profile and the later-described output profile. That is, the sRGB processing is the color conversion processing that is executed without using any ICC profile and is executed with use of the conversion table which is held in advance before the printer 100 receives the image data. However, since sRGB is the output color space of the printer in the present embodiment, in a case where the sRGB processing is selected, the data conversion unit 108 does not perform the color conversion processing for the JPEG data in the present flowchart. Therefore, in a case where the sRGB processing is selected, the color conversion processing is skipped in the present flowchart. In this way, there is a case in which the color space of the JPEG data is the color space that is set as the output color space of the printer. Therefore, by specifying the color space of the image data before performing the color conversion processing, it is possible to prevent the essentially unnecessary color conversion processing from being executed.

If it is determined that the input color space is not sRGB (NO in S409), the processing proceeds to S410. Note that, specifically, the case of NO in S409 is a case in which the input color space is Display-P3, DCI-P3, or the like. In S410, the CPU 101 determines whether an input profile included in the JPEG file has been obtained. The process of the present step may be the same as that of S404.

If the input profile has been obtained (YES in S410), the CPU 101 obtains the output profile, which is held in advance before the printer 100 obtains the image data, from a memory of the printer 100 in S411. This output profile is an ICC profile for converting the XYZ color space, which is the standard color space, into the color space that is set as the output color space of the printer 100. In the present flowchart, since the color space that is set as the output color space is sRGB, an ICC profile for converting the XYZ color space which is the standard color space, into sRGB is obtained as the output profile. If multiple output color spaces can be selected, the output color space will be determined, so that the output profile for the conversion into the determined output color space will be obtained.

In the present embodiment, in a case where the input color space is neither sRGB nor AdobeRGB, the color conversion processing based on the ICC profile (using the ICC profile) is executed. Therefore, in S412, the CPU 101 generates a conversion formula for converting the color space of the JPEG data into the color space that is set as the output color space, based on the input profile and the output profile, as the preparation for the color conversion processing based on the ICC profile. The conversion formula will be described later.

In S413, the color conversion processing based on the ICC profile is selected, and the CPU 101 outputs the JPEG data to the data conversion unit 108. The data conversion unit 108 performs the color conversion processing on the JPEG data, based on the conversion formula prepared in S412. That is, here, the color conversion processing using the ICC profile is executed.

Further, after the end of the present flowchart, the data conversion unit 108 will perform the conversion into print data. Specifically, the data conversion unit 108 converts the color space of the image data for which the color conversion processing was performed in S408 or S413 or the image data for which the color conversion processing was not performed in the present flowchart because of YES in S409 into DeviceRGB. Here, for the conversion into DeviceRGB, different color conversion matrices are used depending on the types of print sheet, which is the printing target, and the ICC profile is not used. That is, in the present embodiment, the printer 100 has a different color conversion matrix for each type of print sheet. Further, the printer 100 executes printing based on the image data (the print data) after the color space is converted into DeviceRGB.

Needless to say, the color conversion processing with the data conversion unit 108 is executed for all the pixels of the image. The above is the color conversion processing in the present embodiment.

Note that, in the above description, the explanation was given of the processing in the state where the output color space is set as sRGB. Note that, for example, in the processing in a state where the output color space is set as AdobeRGB, the color conversion processing is skipped after YES in S407. Further, after YES in S409, the JPEG data is output to the data conversion unit 108, and the data conversion unit 108 performs the sRGB processing for the JPEG data. That is, in the present embodiment, if the color space that is specified as the input color space is the same as the color space that is set as the output color space, the color conversion processing will be skipped. Further, if the color space that is specified as the input color space is not the same as the color space that is set as the output color space, the color conversion processing for converting the color space that is specified as the input color space into the color space that is set as the output color space will be executed. Note that the processing after NO in S409 will be the same as the processing in the state where the output color space is set as sRGB.

Further, there is a state in which the output color space is set as a color space (for example, DeviceRGB) that is neither sRGB nor AdobeRGB. In this case, there is no chance that the color space that is specified as the input color space is the same as the color space that is set as the output color space. Therefore, in the above-described case, after YES in S407 as well as after YES in S409, the color conversion processing for converting the color space that is specified as the input color space into the color space that is set as the output color space will be executed. Further, the processing after NO in S409 will be the same as the processing in the state where the output color space is set as sRGB. That is, in the above-described case, the color conversion processing will be executed regardless of the color space that is specified as the input color space.

Further, in the above description, the explanation was given on an assumption that the printer 100 stores the conversion table for converting AdobeRGB into sRGB and the conversion table for converting sRGB into AdobeRGB. In addition, it is also possible to hold a conversion table for converting a color space other than AdobeRGB or sRGB into AdobeRGB, sRGB, or another color space. In this case, in the above-described flow, whether the input color space is a color space for which the color conversion into the output color space can be performed with the conversion table stored in the printer 100 will be additionally determined.

Further, although the system in which image data is received via the standard protocol was explained in the above description, there is a case in which image data is received via a unique protocol, for example. In a case where image data is received via a unique protocol, the color conversion processing on the image data will be executed by a printer driver on the external apparatus side. That is, the color space of the image data received via the unique protocol is DeviceRGB. In that case, it is possible to execute printing based on the image data without executing any color conversion processing in the printer 100.

[About the Process of Specifying the Input Color Space]

Figure 5:
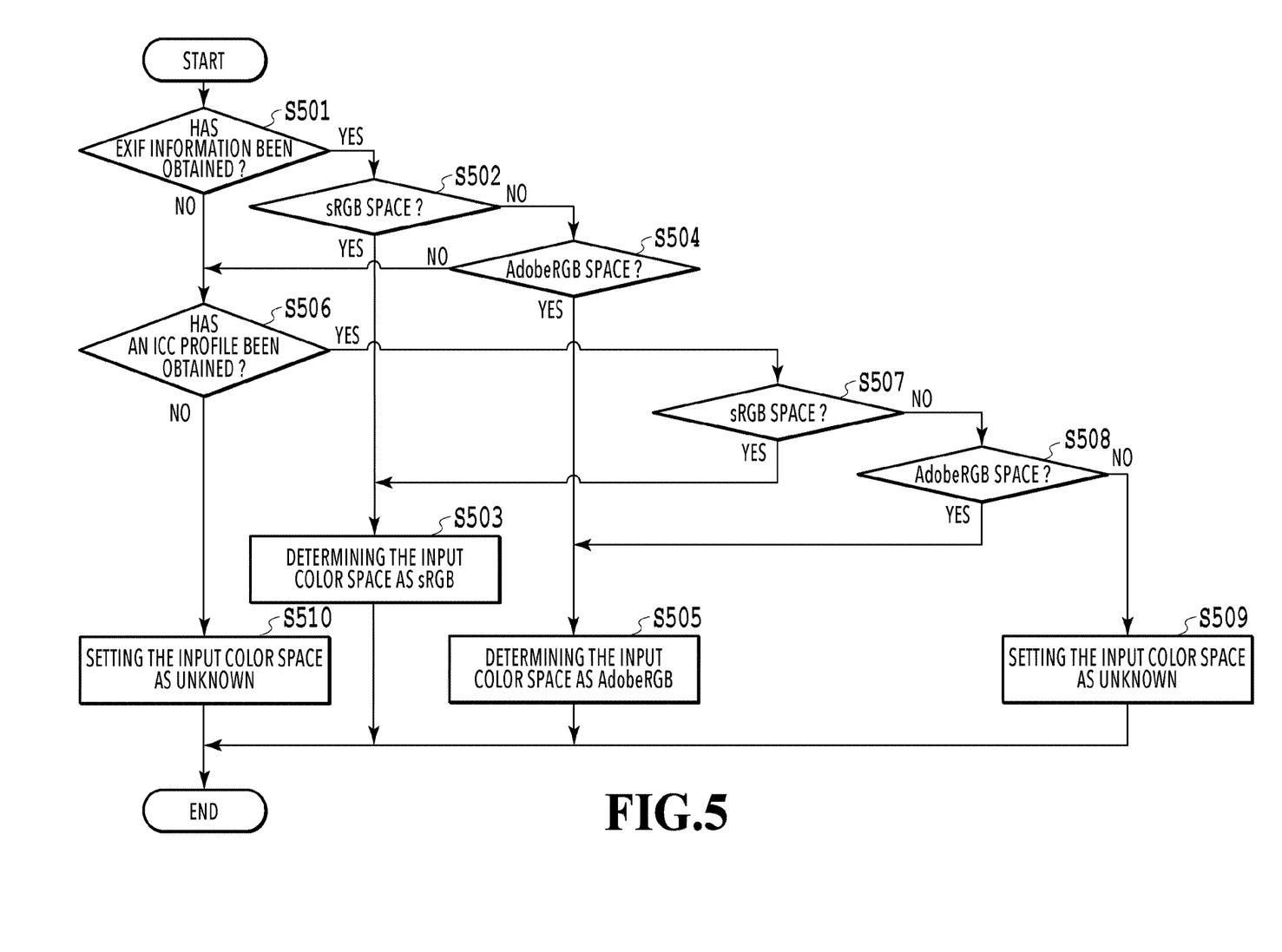
FIG. 5 is a flowchart illustrating the process of specifying the input color space.

FIG. 5 is a flowchart for explaining the details of the process of specifying the input color space. The process of S406 of FIG. 4 will be explained with reference to FIG. 5.

In S501, the CPU 101 determines whether EXIF information has been obtained from the JPEG file. For example, if the process of the step of S403 has been performed, it will be determined that EXIF information has been obtained.

If EXIF information has been obtained (YES in S501), the CPU 101 determines whether the color space of the JPEG data is sRGB, based on the EXIF information, in S502.

Figure 6A:
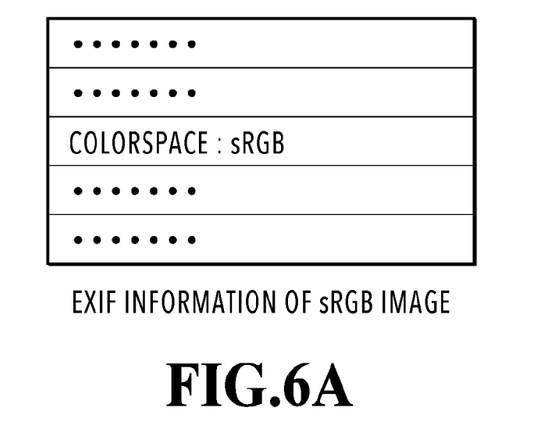
FIG. 6A and FIG. 6B are diagrams illustrating the contents of EXIF information.
Figure 6B:
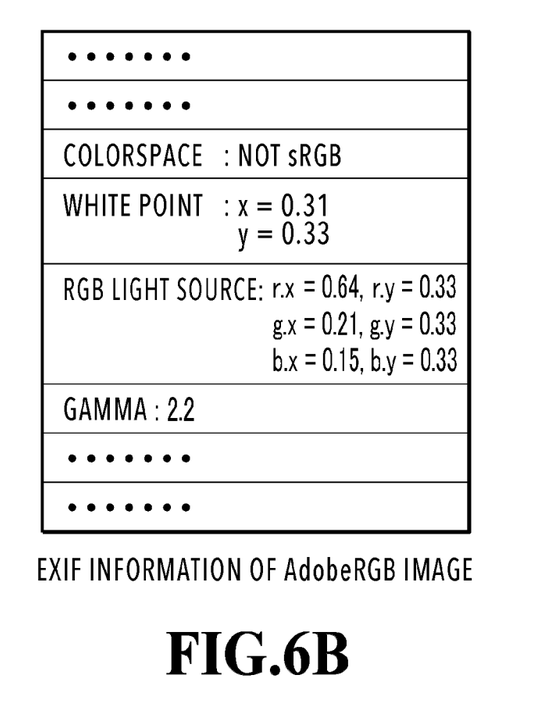

FIG. 6A and FIG. 6B are diagrams illustrating an example of information held in each item of EXIF information. FIG. 6A is an example of EXIF information attached to JPEG data in a case where the color space of the JPEG data is sRGB. In a case where the color space is sRGB, information that is indicative of sRGB is stored in the ColorSpace tag. Therefore, the CPU 101 can determine whether the color space of the image data is sRGB by utilizing the information of the ColorSpace tag.

If the color space is determined as sRGB (YES in S502), the CPU 101 specifies the input color space as sRGB in S503 and ends the processing.

On the other hand, if the color space is not determined as sRGB (NO in S502), the CPU 101 determines whether the color space of the JPEG data is AdobeRGB, based on the EXIF information, in S504.

FIG. 6B is an example of EXIF information attached to JPEG data in a case where the color space of the JPEG data is AdobeRGB. In a case where the color space is AdobeRGB, information that is indicative of not being sRGB is stored in the ColorSpace tag. Further, in the tags of WHITE POINT, RGB LIGHT SOURCE, and GAMMA, such predetermined values for making a determination as AdobeRGB as illustrated in FIG. 6B are stored. Therefore, by utilizing these information, the CPU 101 determines whether to be AdobeRGB.

If the color space is determined as AdobeRGB (YES in S504), the CPU 101 specifies the input color space as AdobeRGB in S505 and ends the color space specification processing.

On the other hand, if EXIF information has not been obtained (NO in S501) or if the color space cannot be specified from the EXIF information (NO in S504), the processing proceeds to S506.

In S506, the CPU 101 determines whether an input profile has been obtained from the JPEG file. For example, if the process of the step of S405 has been performed, it is determined that an input profile has been obtained.

If an input profile has been obtained (YES in S506), the CPU 101 determines whether the color space of the JPEG data is sRGB, based on the input profile, in S507.

Figure 7A:
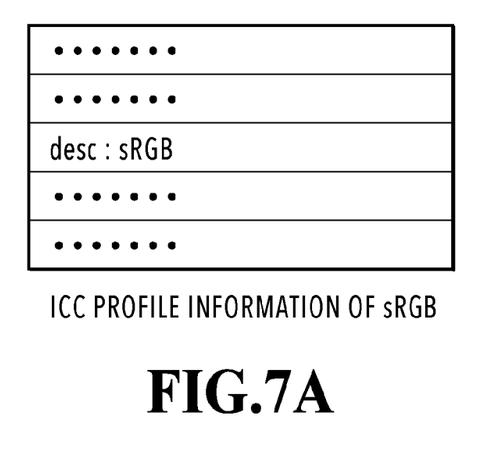
FIG. 7A and FIG. 7B are diagrams illustrating the contents of an ICC profile.
Figure 7B:
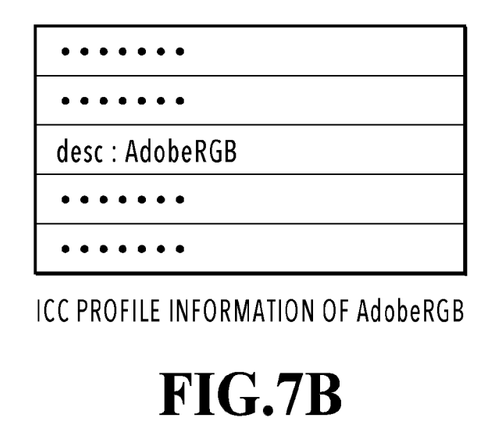

FIG. 7A and FIG. 7B are diagrams illustrating an example of information held in an input profile. FIG. 7A is an example of an input profile attached to JPEG data in a case where the color space of the JPEG data is sRGB. In a case where the color space is sRGB, information that is indicative of sRGB is stored in the description tag. Therefore, the CPU 101 can specify the color space of the image data by utilizing the information of the input profile.

If the color space is determined as sRGB (YES in S507), the processing proceeds to S503, so that the CPU 101 specifies the input color space as sRGB and ends the color space specification processing.

On the other hand, if the color space is not determined as sRGB (NO in S507), the CPU 101 determines whether the color space of the JPEG data is AdobeRGB, based on the input profile, in S508.

FIG. 7B is an example of an input profile attached to JPEG data in a case where the color space of the JPEG data is AdobeRGB. In a case where the color space is AdobeRGB, since the character string that is indicative of AdobeRGB is stored in the description tag, the CPU 101 determines whether to be AdobeRGB by utilizing this information.

As described above, in the present embodiment, the color space of the JPEG data can be specified from the input profile. Therefore, even if the JPEG file does not include EXIF information or if the color space cannot be specified from EXIF information, the color space can be specified.

If the color space is determined as AdobeRGB (YES in S508), the processing proceeds to S505, so that the CPU 101 specifies the input color space as AdobeRGB and ends the color space specification processing.

On the other hand, if an input profile has not been obtained (NO in S506), the processing proceeds to S510. In S510, the CPU 101 sets the input color space as unknown and ends the processing of the present flowchart. In a case where the processing proceeds to S510, the input color space cannot be specified and an input profile has not been obtained. Therefore, in the flowchart of FIG. 4, it will be determined as NO in S410, so that the sRGB processing will be performed on the JPEG data.

If the color space cannot be specified from the input profile (NO in S508), the processing proceeds to S509. In S509, the CPU 101 sets the input color space as unknown and ends the processing of the present flowchart. In this case, since the input profile has been obtained, it will be determined as YES in S410 in the flowchart of FIG. 4, so that the color conversion processing will be performed based on the input profile. The above is the process of specifying the input color space.

In the present embodiment, as a method of specifying the color space, the explanation was given of the method of specifying the color space of JPEG data, based on a specific tag in EXIF information and an input profile and the contents thereof. Alternatively, it is also possible that the input color space is specified based on information of other tags in EXIF information and an input profile. Further, in the color space specification processing of the present embodiment, it is also possible to determine whether the input color space is a color space other than AdobeRGB and sRGB. In that case, by preparing the information included in EXIF information and an input profile for specifying the other color space, the color space can be specified in the same manner as the processing of the flowchart of FIG. 5.

[About the AdobeRGB Processing]

Figure 8:
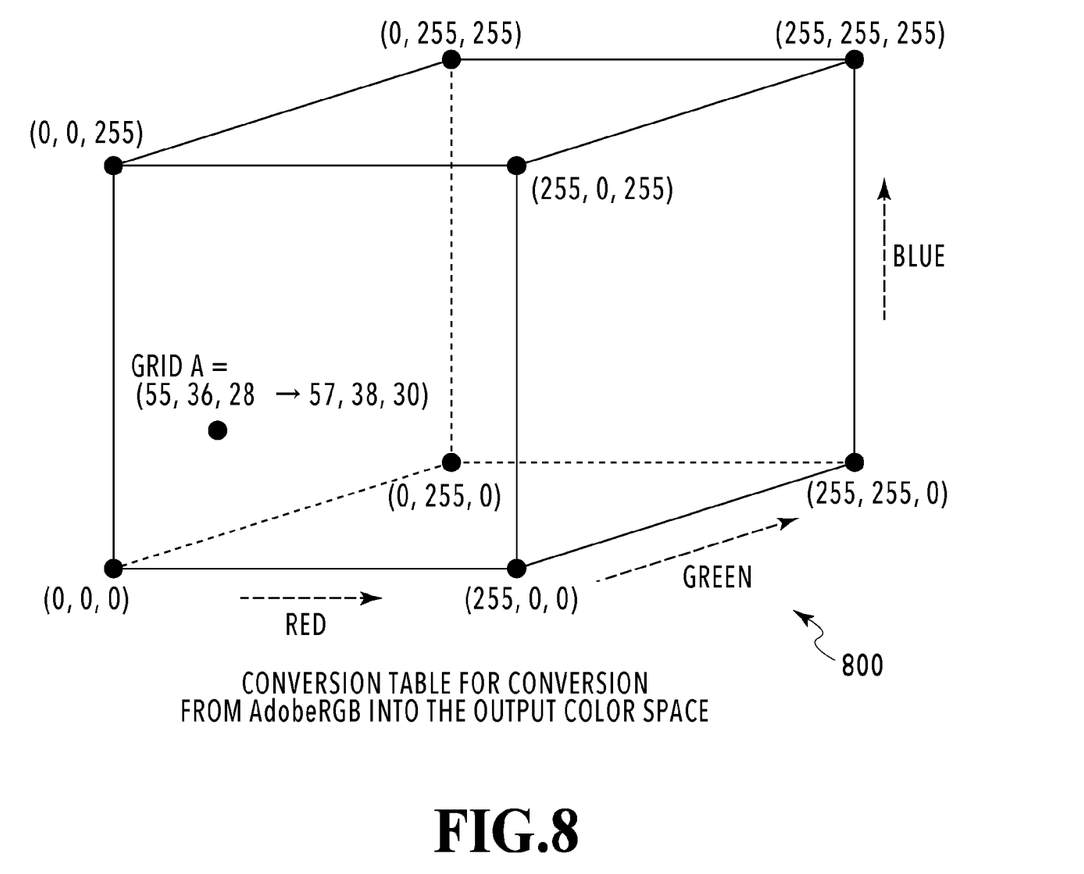
FIG. 8 is a diagram for explaining a conversion table.

FIG. 8 is a diagram for explaining a conversion table to be used for the color conversion processing by the AdobeRGB processing. The AdobeRGB processing in S408 of FIG. 4 will be explained with reference to FIG. 8.

The conversion table 800 of FIG. 8 is a table stored in the printer 100 in advance and used for the color conversion processing from AdobeRGB to the output color space. The conversion table 800 is an example of a conversion table of a case where the output color space is sRGB. In FIG. 8, the conversion table 800 is represented in a three-dimensional manner. Since the method of the color conversion processing using a conversion table is a publicly-known technology, only an outline will be explained.

The conversion table 800 is a table having RGB values that are color values of sRGB, which correspond to the respective grids of RGB values that are color values of AdobeRGB. The RGB values are a combination of three signal values in which the respective signal values of R, G, and B have values of 0 to 255. The color conversion processing can be performed by finding the RGB values in the sRGB space from the RGB values of AdobeRGB, which are the input values, by use of the conversion table.

It is assumed that the RGB values are represented by (R signal value, G signal value, B signal value). In this case, for example, the conversion table 800 holds the RGB values (57, 38, 30) of the sRGB space corresponding to the RGB values (55, 36, 28) of the AdobeRGB space.

By using another conversion table, it is possible to perform conversion into a color space other than sRGB. For example, by configuring a conversion table so that the output color values become color values of DeviceRGB or color values of a color space for ink colors such as CMYK, it is possible to approach the conversion into an output color space other than the sRGB color space.

Further, although the method of using the conversion table was explained as the AdobeRGB processing in the present embodiment, it is also possible to implement the AdobeRGB processing by a predetermined calculation processing. Publicly-known technologies can be used for the predetermined calculation processing.

Further, since this conversion processing and calculation processing are predetermined processing, it is possible to provide higher-speed processing by developing hardware or an operation circuit, as compared with software.

Further, since the output color space is explained as sRGB in the present embodiment, it was assumed in the explanation that the color conversion processing on JPEG data is skipped in a case where the sRGB processing is selected. In addition, in a case where the output color space is a color space other than sRGB (for example, DeviceRGB), by configuring a conversion table for conversion from sRGB into the output color space, it is possible to implement the sRGB processing in a method of color conversion processing similar to the AdobeRGB processing. For example, if the input is performed with RGB values of sRGB and the output is performed with RGB values of DeviceRGB, the color conversion processing for conversion from sRGB into DeviceRGB can be implemented.

[About the Color Conversion Processing Based on an Input Profile]

Figure 9A:
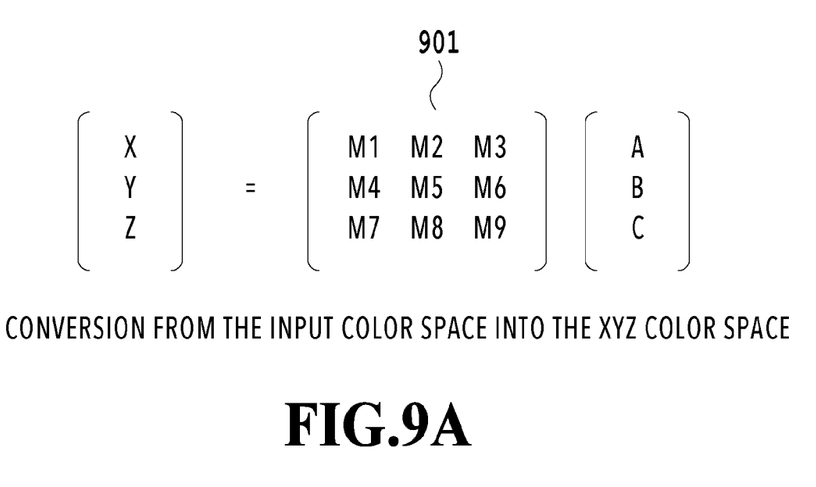
FIG. 9A and FIG. 9B are diagrams for explaining a color conversion formula based on an ICC profile.
Figure 9B:
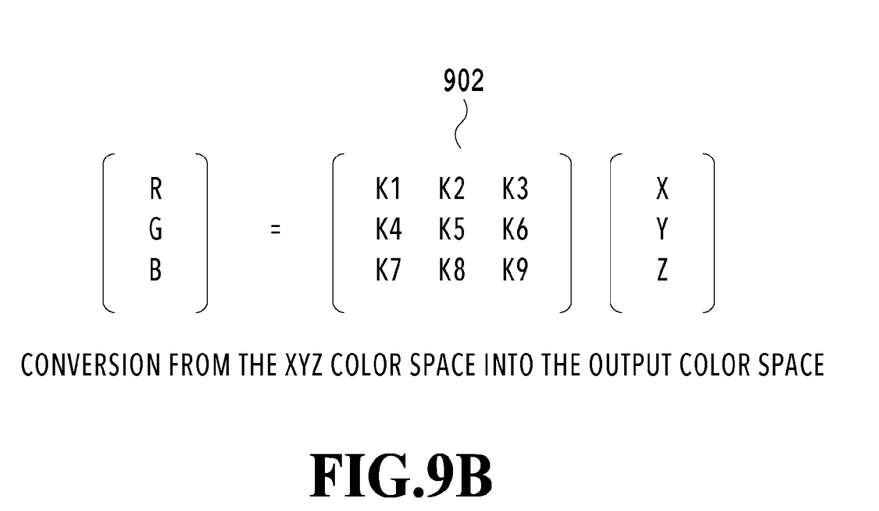

FIG. 9A and FIG. 9B are diagrams for explaining the color conversion processing using color conversion information included in an input profile. Next, the generation of a conversion formula to be used in the color conversion processing based on an input profile in S413 will be explained with reference to FIG. 9A and FIG. 9B.

FIG. 9A is a conversion formula for conversion from the input color space into the XYZ color space which is the standard color space. The input profile includes the matrix 901 to be used in the conversion formula for conversion from the input color space into the XYZ color space which the standard color space. Therefore, by use of the matrix 901, it is possible to generate a conversion formula for converting the input color space into the XYZ color space.

In addition to the matrix 901, the input profile may include a look-up table which shows the correspondence between the color values in the input color space and the color values in the XYZ color space. In this case, it is possible to convert the input color space into the XYZ color space by use of the look-up table.

FIG. 9B is a diagram illustrating a conversion formula for conversion from the XYZ color space which is the standard color space, into the sRGB color space which is the output color space. The matrix 902 of FIG. 9B is included in the output profile which is obtained in S411. The output profile defines the output color space of the printer 100, and, since the output color space is the sRGB color space in the present embodiment, it is possible to perform the color conversion processing from the XYZ color space which is the standard color space, into the output color space by use of a conversion formula using the matrix 902. In a case where the output color space is DeviceRGB, the matrix 902 is a matrix for conversion from the XYZ color space into DeviceRGB.

Note that, although the explanation was given on an assumption that the output profile is the matrix 902, it is also possible that the output profile is a look-up table in which the color values in the XYZ color space and the color values in the output color space are associated with each other. That is, in the color conversion processing based on an input profile, the color conversion processing from the XYZ color space into the output color space may be performed by use of the look-up table. Needless to say, although the contents of the above-described example relate to a case of using two profiles, i.e., the input and output profiles, it is possible to define the conversion processing using one profile or three or more profiles, alternatively.

As shown FIG. 9A and FIG. 9B, the color conversion processing using an input profile may need the color conversion processing into the XYZ color space which is the standard color space. Further, the input profile may include only the matrix 901 and not include a look-up table as information necessary for the color conversion processing into the standard color space.

On the other hand, the conversion table 800 is stored in advance in the printer 100 of the present embodiment. The color conversion processing using the conversion table 800 can be executed faster than the color conversion processing by the calculation using a matrix included in an ICC profile. Further, even in a case where the AdobeRGB processing is implemented by predetermined calculation processing, the calculation processing is performed so as to perform direct conversion from the input color space into the output color space in the AdobeRGB processing. On the other hand, in the color conversion processing based on an ICC profile, it is necessary to perform conversion into the standard color space and then into the output color space.

Further, even in a case where an ICC profile includes a look-up table, the look-up table is for color conversion into the standard color space. Therefore, in the color conversion processing based on the ICC profile, it is necessary to further perform conversion into the output color space after conversion into the standard color space. On the other hand, since it is possible to perform conversion from the input color space into the output color space of the printer in the color conversion processing using the conversion table 800, the processing can be executed faster than the conversion using the ICC profile.

As explained above, in the present embodiment, even in a case where there is an input profile attached to JPEG data, the color space of the JPEG data is specified before the color conversion processing. Further, even if there is an input profile, in a case where the color conversion processing of the color space of the JPEG data can be performed with the conversion table 800 of the printer 100, the color conversion processing is performed without using the input profile. Therefore, according to the present embodiment, even in a case where both an ICC profile and photographic information are attached to image data, the color conversion processing can be appropriately performed.

Note that, although the processing for one image is described in the present embodiment, it is also possible to perform the same processing on multiple images. According to the technology of the present disclosure, it is possible to convert the color space of image data by more appropriate color conversion processing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-010687, filed Jan. 26, 2021, which is hereby incorporated by reference wherein in its entirety.

What is claimed is:

1. An image processing apparatus comprising:
one or more processors that read out and execute computer executable instructions; and
a non-transitory computer-readable storage medium on which the computer executable instructions are recorded, and which when executed cause the one or more processors to:
obtain image data and predetermined information related to the image data;
specify a color space of the obtained image data, based on the obtained predetermined information; and
convert the color space of the obtained image data into a color space that is set as an output color space,
wherein, in the converting of the color space of the obtained image data, in a case where the specified color space is a predetermined color space corresponding to information that is held in advance by the image processing apparatus before the image processing apparatus obtains the image data, even if the obtained predetermined information includes color conversion information for converting the color space of the obtained image data into another color space, the color space of the obtained image data is converted by use of the information that is held in advance before the image processing apparatus obtains the image data, without using the color conversion information that is included in the obtained predetermined information,
wherein, in a case where the specified color space is a different color space that is different from the predetermined color space and the obtained predetermined information includes the color conversion information, the color space of the obtained image data is converted from the different color space by use of the color conversion information that is included in the obtained predetermined information, and
wherein the color space that is set as the output color space is any one of sRGB, AdobeRGB, and Device-RGB, the predetermined color space is sRGB or AdobeRGB, and a different color space that is different from the predetermined color space is Display-P3 or DCI-P3.

2. The image processing apparatus according to claim 1, wherein, in a case where the color space of the obtained image data cannot be specified and the obtained predetermined information includes the color conversion information, the color space of the obtained image data is converted by use of the color conversion information that is included in the obtained predetermined information.

3. The image processing apparatus according to claim 1, wherein the color conversion information that is included in the obtained predetermined information is information for converting the color space of the obtained image data into a standard color space,
wherein the executable instructions further cause the one or more processors to obtain information for converting the standard color space into the color space that is set as the output color space, and
wherein the color space of the obtained image data is converted into the standard color space and then the standard color space is converted into the color space that is set as the output color space in a case where the specified color space is not the predetermined color space.

4. The image processing apparatus according to claim 1, wherein the information that is held in advance before the image processing apparatus obtains the image data is a table in which a color value of the predetermined color space and a color value of the color space that is set as the output color space are associated with each other, and wherein, in a case where the specified color space is the predetermined color space, even if the obtained predetermined information includes the color conversion information, the color space of the obtained image data is converted by use of the table, without using the color conversion information that is included in the obtained predetermined information.

5. The image processing apparatus according to claim 1, wherein, in a case where the specified color space is the color space that is set as the output color space, the color space of the obtained image data is not converted into the color space that is set as the output color space.

6. The image processing apparatus according to claim 1, wherein the color conversion information that is included in the obtained predetermined information is an ICC profile.

7. The image processing apparatus according to claim 6, wherein, in a case where the specified color space is the predetermined color space corresponding to the information that is held in advance before the image processing apparatus obtains the image data, even if the obtained predetermined information includes the color conversion information for converting the color space of the obtained image data into another color space, the color space of the obtained image data is converted by use of the information that is held in advance before the image processing apparatus obtains the image data, without using any ICC profile.

8. The image processing apparatus according to claim 1, wherein the obtained predetermined information includes at least one of an ICC profile and EXIF information, and
wherein the color space of the obtained image data is specified, based on at least one of the ICC profile and the EXIF information.

9. The image processing apparatus according to claim 1, wherein the image processing apparatus further comprises a printer configured to execute printing on a printing medium, based on the image data whose color space is converted into the color space that is set as the output color space, and
wherein the output color space is a color space that can be reproduced by the printer.

10. The image processing apparatus according to claim 9, wherein the color space that is set as the output color space is determined based on a type of the printing medium that is a target of the printing executed by the printer.

11. The image processing apparatus according to claim 1, wherein the image data is obtained via IPP (Internet Printing Protocol).

12. The image processing apparatus according to claim 1, wherein the obtained image data is image data in JPEG format.

13. The image processing apparatus according to claim 1, wherein the executable instructions further cause the one or more processors to further convert the color space that is converted by use of the information that is held in advance before the image processing apparatus obtains the image data into a specific color space without using the color conversion information that is included in the obtained predetermined information, and wherein printing is executed based on the image data whose color space is converted into the specific color space.

14. The image processing apparatus according to claim 13, wherein the specific color space is DeviceRGB.

15. The image processing apparatus according to claim 13, wherein, for the conversion into the specific color space, a color conversion matrix based on a type of a printing medium to be a target of the printing is used, and an ICC profile is not used.

16. The image processing apparatus according to claim 1, wherein, in a case where a printer driver of an external apparatus is used so that image data is obtained from the external apparatus, printing based on the image data is executed without a conversion into a specific color space by the image processing apparatus, and, in a case where image data is obtained from the external apparatus without using the printer driver of the external apparatus, the printing based on the image data is executed with the conversion into the specific color space by the image processing apparatus.

17. A control method of an image processing apparatus, the control method comprising:
obtaining image data and predetermined information related to the image data;
specifying a color space of the obtained image data, based on the obtained predetermined information; and
converting the color space of the obtained image data into a color space that is set as an output color space,
wherein, in the converting, in a case where the specified color space is a predetermined color space corresponding to information that is held in advance by the image processing apparatus before the image processing apparatus obtains the image data, even if the obtained predetermined information includes color conversion information for converting the color space of the obtained image data into another color space, the color space of the obtained image data is converted by use of the information that is held in advance before the image processing apparatus obtains the image data, without using the color conversion information that is included in the obtained predetermined information,
wherein, in a case where the specified color space is a different color space that is different from the predetermined color space and the obtained predetermined information includes the color conversion information, the color space of the obtained image data is converted from the different color space by use of the color conversion information that is included in the obtained predetermined information, and
wherein the color space that is set as the output color space is any one of sRGB, AdobeRGB, and DeviceRGB, the predetermined color space is sRGB or AdobeRGB, and a different color space that is different from the predetermined color space is Display-P3 or DCI-P3.

18. A non-transitory computer readable storage medium storing a program which causes a computer to perform a control method of an image processing apparatus, the control method comprising:
obtaining image data and predetermined information related to the image data;
specifying a color space of the obtained image data, based on the obtained predetermined information; and converting the color space of the obtained image data into a color space that is set as an output color space, wherein, in the converting, in a case where the specified color space is a predetermined color space corresponding to information that is held in advance by the image processing apparatus before the image processing apparatus obtains the image data, even if the obtained predetermined information includes color conversion information for converting the color space of the obtained image data into another color space, the color space of the obtained image data is converted by use of the information that is held in advance before the image processing apparatus obtains the image data, without using the color conversion information that is included in the obtained predetermined information, wherein, in a case where the specified color space is a different color space that is different from the predetermined color space and the obtained predetermined information includes the color conversion information, the color space of the obtained image data is converted from the different color space by use of the color conversion information that is included in the obtained predetermined information, and wherein the color space that is set as the output color space is any one of sRGB, AdobeRGB, and Device-RGB, the predetermined color space is sRGB or AdobeRGB, and a different color space that is different from the predetermined color space is Display-P3 or DCI-P3.

\* \* \* \* \*